Feb. 22, 1927.
J. E. HUNT ET AL
1,618,929
BARB WIRE SUPPORT
Filed April 2, 1926
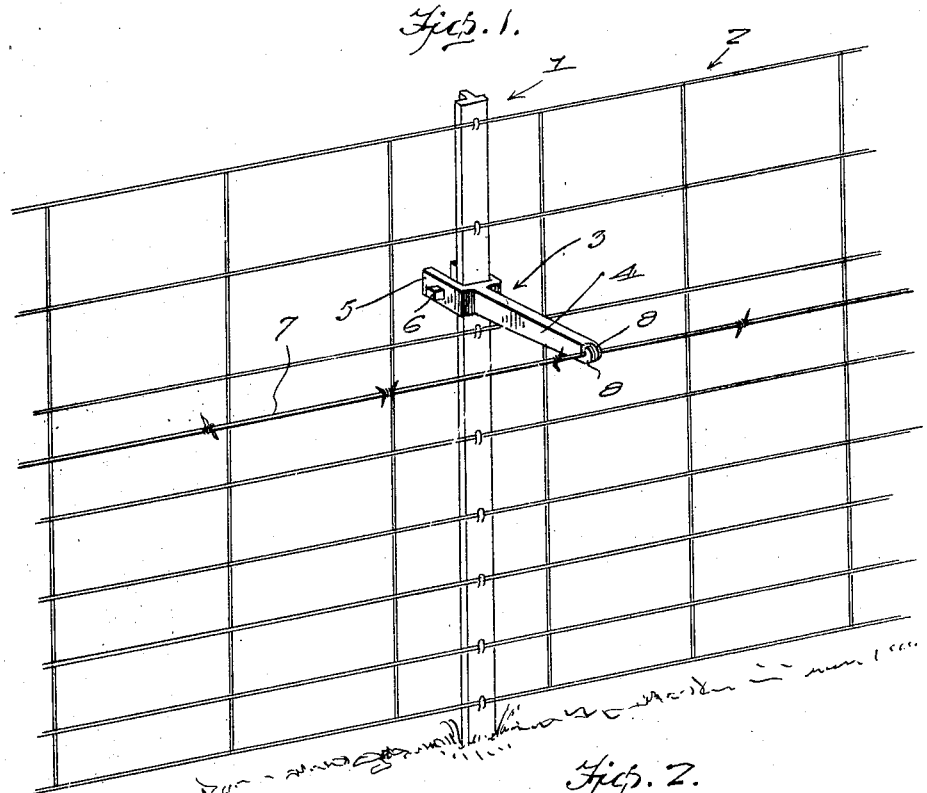
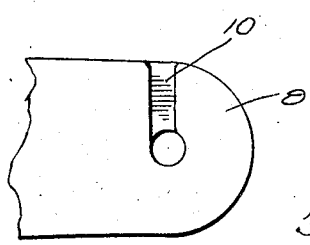
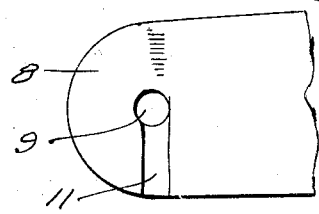
Inventors
J. E. Hunt
C. Ashton
By Clarence A. O'Brien
Attorney Patented Feb. 22, 1927.

1,618,929

UNITED STATES PATENT OFFICE.

JOHN EVAN HUNT AND CLIFFORD ASHTON, OF FORT JENNINGS, OHIO.

BARB-WIRE SUPPORT.

Application filed April 2, 1926. Serial No. 99,295.

This invention relates to an improved device which may be broadly referred to as a barb wire support, the same having more specific reference to a device which is adapted to be attached to a fence post for supporting a barb equipped wire in spaced relation from main fence wire to serve as a guard and protecting means for the main fence wire.

More specifically, the invention has reference to a metal arm which is adapted to be attached to a fence post to extend in a horizontal line at right angles from the post, this arm having novel means for clamping it on the post and being constructed on its outer end to permit easy connection of a barb wire thereto.

Our principal object is to generally improve upon devices of this class by providing one of extreme simplicity and durability which is easy to make use of and which is advantageous to both the manufacturer and the user.

Other features and advantages of the invention will become apparent from the following description and drawings.

In the accompanying drawings forming a part of this application, and in which like numerals are employed to designate like parts throughout the same:—

Figure 1 is a perspective view of a common wire fence, a conventional fence post, and the improved device associated therewith, Fig. 2 is an enlarged view showing the clamping means for the wire supporting arm, Fig. 3 is an enlarged view of the outer end of the arm showing the barbed wire attaching hooks, Fig. 4 is a view like Fig. 3, looking at the opposite side of the attaching hooks.

Referring to the drawing in detail, the reference character 1 designates a fence post, the same being of the conventional T-shaped design. The reference character 2 designates generally a wire fence of conventional form.

Fences of this kind, being comparatively frail, are subject to easy destruction, particularly by animals to be confined within the fenced area. Frequently, an animal thrusts its head between the strands of wire of the fence and in time substantially destroys the fence. It is now a common practice to support a barbed wire in spaced relation from the main fence wire to prevent the animals from coming too close. This is effective with the exception that the means for attaching the wire is usually so frail and insecure as to permit the barbed wire to be readily destroyed.

In carrying out the present invention, we provide an attachment which is generally designated by the reference character 3, the same comprising a metal arm 4 of suitable configuration. At its inner end, this arm is formed with a substantially U-shaped clamp 5, the arms of which straddle the fence as shown. The arms are formed with tapered holes to accommodate a retaining wedge 6 which is driven through the holes to bind the clamp firmly against the post. This allows the arm to be attached to any desired point on the fence to place the barbed wire 8 at the desired elevation. The outer end of the arm is bifurcated, and the furcations 8 have a hole 9 drilled through them. Then, the furcations have slots or notches 10 and 11 formed therein opening in opposite directions as shown and communicating with the holes 9. In this way a pair of spaced hooks are thus provided, and it is obvious that by inserting the barbed wire between the furcations and properly manipulating it, it may be readily engaged with the hooks, then the arms of the clamp may be placed about the fence wedge driven in place to maintain the arm firmly in place at the desired elevation.

It is believed that the advantages and features of construction of the invention will be plain after considering the description in connection with the accompanying drawings. For this reason, a more lengthy description is thought unnecessary.

Minor changes coming within the field of invention claimed may be resorted to if desired.

Having thus described our invention, what we claim as new is:—

As a new article of manufacture, an arm for supporting a barbed wire in spaced relation to a main wire fence, said article including an arm bifurcated at its outer end, the furcations being formed with notches opening in opposite directions to provide a pair of spaced hooks with which a barbed wire may be readily connected, the inner end of said arm being provided with a substantially U-shaped clamp, the arms of which are adapted to straddle a fence post, said arms being formed with registering openings, and a retaining wedge passing through said openings.

In testimony whereof we affix our signature.

JOHN EVAN HUNT.
CLIFFORD ASHTON.